United States Patent
Toomey

[19]

[11] Patent Number: 5,886,636
[45] Date of Patent: Mar. 23, 1999

[54] MOISTURE DETECTION AND SOURCE IDENTIFICATION METHOD FOR STRUCTURES

[75] Inventor: Patrick J Toomey, Alpharetta, Ga.

[73] Assignee: A-Acme, Inc., Atlanta, Ga.

[21] Appl. No.: 991,709

[22] Filed: Dec. 17, 1997

[51] Int. Cl.⁶ .................................................. G08B 21/00
[52] U.S. Cl. ..................... 340/602; 340/604; 340/605; 73/40
[58] Field of Search .................................. 340/602, 604, 340/605, 603, 620; 73/40, 40.5 R

[56] References Cited

U.S. PATENT DOCUMENTS

| | | | |
|---|---|---|---|
| 3,967,197 | 6/1976 | Anderson | 324/61 |
| 4,913,558 | 4/1990 | Wettervick | 73/40.5 R |
| 5,005,005 | 4/1991 | Brossia et al. | 340/604 |
| 5,008,652 | 4/1991 | Wolozyk | 340/605 |
| 5,081,422 | 1/1992 | Shih | 340/605 |
| 5,210,526 | 5/1993 | Imperiali | 340/605 |
| 5,357,441 | 10/1994 | Petty et al. | 364/469 |
| 5,486,815 | 1/1996 | Wagner | 340/602 |
| 5,559,282 | 9/1996 | Knight et al. | 73/40 |
| 5,663,710 | 9/1997 | Fasig et al. | 340/601 |
| 5,684,296 | 11/1997 | Hamblin et al. | 250/227.11 |
| 5,748,092 | 5/1998 | Arsenault et al. | 340/605 |

*Primary Examiner*—Nina Tong
*Attorney, Agent, or Firm*—Law Office of Jon M. Jurgovan

[57] ABSTRACT

The invented method can be applied to a house, building or other structure to detect the presence of a water problem, even in areas that are not visible to the naked eye. The method includes a step of changing the temperature of the structure relative to its temperature existing immediately before the start of the method. The method also includes a step of infrared scanning the structure. Because moist structure areas are slow to move to the changed temperature compared to dry areas due to the relatively high thermal capacity of water, the changed temperature enables the infrared scanning step to readily contrast moisture-suspect areas of the structure from dry areas thereof. The method can also include steps of determining whether a moisture-suspect area does in fact contain moisture, or is due to other causes unrelated to moisture. If moisture is determined to be present in the moisture-suspect area, the method can also include a step of determining the source of the moisture by sampling and analyzing the moisture.

15 Claims, 1 Drawing Sheet

MOISTURE DETECTION AND SOURCE IDENTIFICATION METHOD FOR STRUCTURES

BACKGROUND OF THE INVENTION

1. Field of the Invention

This invention is directed to detection and identification of the source of moisture in a building, house or other structure.

2. Description of the Related Art

The presence of moisture in a structure caused by a leak, for example, is often difficult to detect until the moisture has caused sufficient damage to be apparent to the naked eye. In most cases, moisture from rain or ground can seep inside the walls, ceiling, floor, roof or foundation of a structure and cause widespread damage before being outwardly apparent. By the time the damage is noticeable, however, the structure is often extensively damaged, and requires significant and costly repair work, if the structure can be saved at all. It would therefore be advantageous to detect moisture before the structure is extensively damaged and at a time at which the cause of the moisture source can be stopped without extensive and costly repair. In addition, because repair may necessitate destruction of a portion of the structure to access the water-damaged areas, it is desirable to locate exactly where moisture is and is not present in the structure so that undamaged portions of the structure can be left intact while repairing the damaged portions of the structure and stopping the source of the water problem.

A technology that is somewhat related to this invention is used to detect drafts in a house or building for energy consumption analysis. In this technology, a door is removed from the structure and a vacuum duct is attached about the doorway. The vacuum draws air into the structure through cracks or other openings in the structure, and the structure is examined with an infrared scanner. The infrared scanner reveals relatively cool areas of the structure in which air is drawn into the structure with the vacuum system. Although this technology is meritorious to an extent in detecting drafts, it is not intended, and is totally ineffective, for the detection of leaks or other moisture-producing sources that can cause major damage to a structure.

SUMMARY OF THE INVENTION

This invention overcomes the above-noted disadvantages. The invented method can be used to detect the presence of moisture in a building, house or other structure, even in areas that are not visible to the naked eye. Such areas can include the inside or outside of a wall, ceiling or floor, or areas of a structure's roof or foundation, for example. Further, the invented method can be used to determine the source of the water problem as either rain, rising damp (i.e., water rising from the ground about the structure), or condensation.

The invented method includes a step of changing the temperature of a structure, either above or below its temperature pre-existing before the performance of the method. The invented method also includes a step of infrared scanning the structure to detect areas that are slow to move to the changed temperature relative to other areas. Because water in moist areas of the structure has a relatively high thermal capacity, such moist areas will in virtually all cases move to the changed temperature at a slower rate than the structure's dry areas. Suspect moist areas of the structure are thus readily contrasted from dry areas in the infrared scanning step. The infrared scanning step is preferably performed, however, after sufficient time elapses from the onset of the temperature change so that the temperature difference between the moist and dry areas is sufficiently large to allow these areas to be readily contrasted. Also, the infrared scan is performed before the moist areas have the opportunity to move to equilibrium at the changed temperature which will be sooner reached in the dry areas. The method can also include a step of determining whether a moisture-suspect area that changes in temperature relatively slowly is in fact due to the presence of moisture as opposed to other causes such as missing insulation or variations in the structure's materials. Further, the invented method can include steps of sampling moisture from a moist area of the structure, a step of analyzing the moisture, and a step of determining the source of the moisture, based on the results of the analyzing step.

The temperature changing step can be performed using the structure's heating/air-conditioning system. More specifically, the temperature changing step can be performed by adjusting the thermostat of the structure's heating/air-conditioning system to heat or cool the structure to a temperature different from its temperature pre-existing before the performance of the method. Alternatively, a portable heater or cooling unit can be used in the performance of the temperature changing step. The temperature changing step is preferably performed so as to heat or cool the structure sufficiently above or below its pre-existing temperature so that the structure's dry areas which are relatively quick to respond to the changed temperature, can be readily distinguished in the infrared scanning step from moisture-suspect areas whose temperatures are relatively slow to respond to the changed temperature. If heating is used in the temperature changing step, such heating is preferred not to be performed to so great an extent that moisture in the structure is significantly evaporated and a potential water problem thus disguised. Alternatively, the temperature changing step can be performed by cooling the structure with the structure's air conditioning system, for example, to an extent sufficient to contrast structure areas with slowly and rapidly changing temperatures in the infrared scanning step.

The infrared scanning step can be performed with a variety of commercially-available instruments, and detects the thermal radiation given off by the structure. The infrared scanning step detects the presence of structure areas that are relatively slow to respond to the changed temperature, and that are thus areas suspected of being moist. The infrared scanning step can be performed from the outside or inside of the structure, typically section-by-section, along the structure's surfaces.

The step of determining whether the detected moisture-suspect area of the structure is due to the presence of moisture, rather than other causes such as missing insulation or a change in the structure or materials thereof, can be performed using one or a combination of several techniques. For example, the cool areas can be determined to be due to the presence of water by scanning the structure with a capacitance meter, and determining whether or not the moisture-suspect area is due to the presence of moisture, based on the capacitance-meter scanning. Alternatively, the determination of whether the moisture-suspect area revealed by infrared scanning is due to water can be determined by inserting and positioning an endoscopic probe in the structure in proximity to the moisture-suspect area, viewing the moisture-suspect area with the endoscopic probe, and determining whether the moisture-suspect area is moisture-derived by what is seen in the structure through the endoscopic probe. Another alternative is to insert conductive pins into the structure in proximity to the moisture-suspect area detected by infrared scanning, applying a signal to at least one of the pins, detecting the resulting signal level at the other probe, and determining whether the moisture-suspect area is due to the presence of moisture, based on the detected signal level.

To identify the source of a water problem, the method can include steps of sampling moisture from the structure area determined to have moisture, analyzing the moisture, and determining the source of the moisture, based on the analysis. The analyzing step can be performed with a number of techniques to determine the source of the water problem. For example, the analyzing step can be performed by detecting the pH of the moisture with a device such as a pH meter or litmus paper, and the results of the analyzing step can be used in the moisture-source determination step. If the analyzing step reveals the moisture to be relatively acidic, the source is likely rain. Conversely, if the moisture is not slightly acidic, rain can be ruled out as not the probable source of the water problem. As another alternative, the analyzing step can be performed by detecting whether salts are present in the moisture with a salinity meter, spectroscopy equipment or other device. If the moisture is relatively saline, the source of the moisture is determined to be rising damp which carries salts from the ground about the structure. On the other hand, if the moisture is not relatively saline, rising damp is determined not to be the source of the water problem. In yet another alternative technique, the analyzing step determines whether the moisture is relatively pure. Such analysis can be carried out with a wide variety of techniques or devices, such as a combination of pH and salinity meters, or spectroscopy equipment, for example. If the moisture is relatively pure water, the source of the moisture is determined to be condensation. Conversely, if the moisture is not relatively pure, condensation is determined not to be the source of the water problem. The above techniques of the invented method can thus be used to determine the source of the water problem to simplify the pinpointing of leaks, rising damp or condensation problems. Appropriate measures beyond the scope of this invention can then be taken to eliminate the water problem and repair any damage caused thereby.

These together with other objects and advantages of the claimed invention will become subsequently apparent in the following details of the invented method.

DESCRIPTION OF THE PREFERRED EMBODIMENTS

Figure 1:
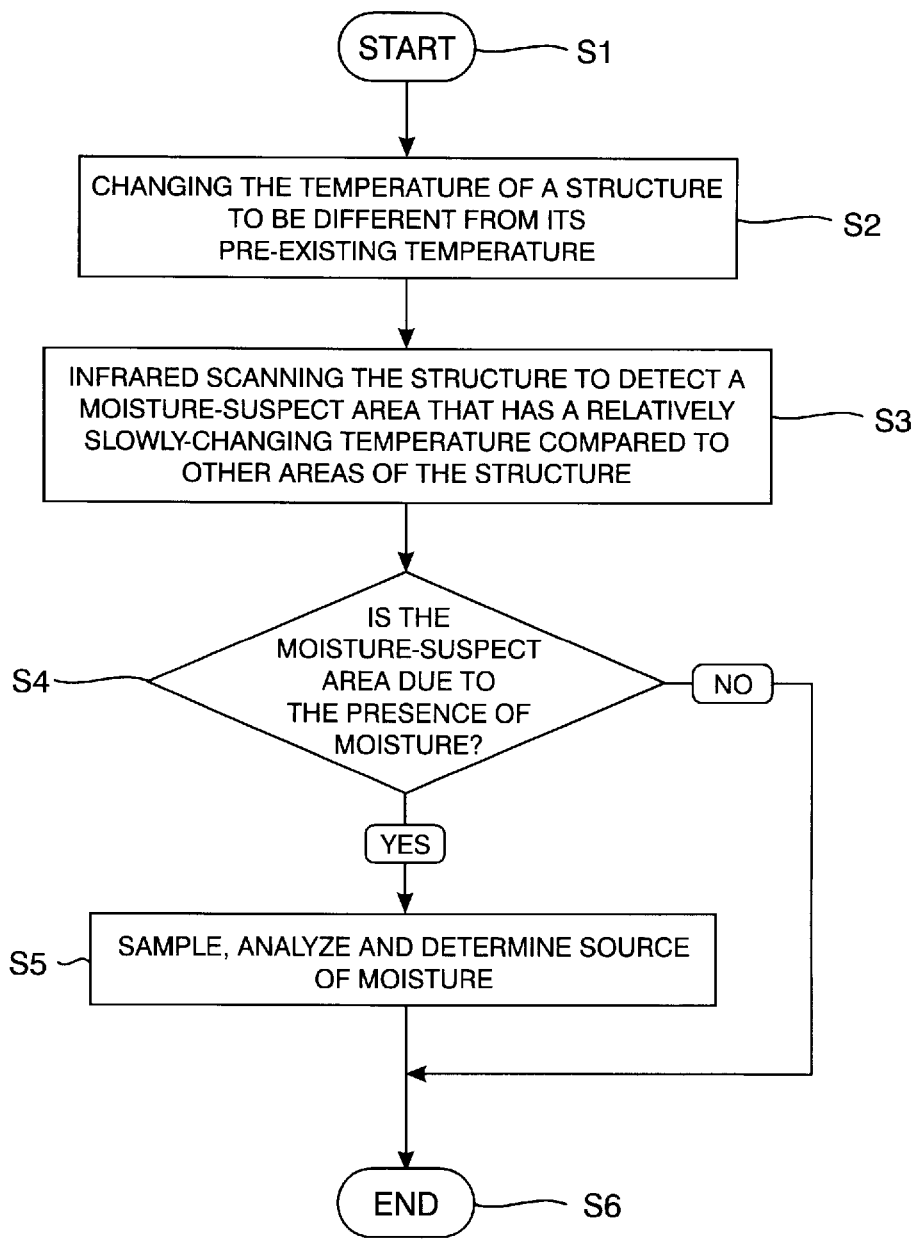
FIG. 1 is a flow diagram of preferred steps of the invented method.

The invented method is particularly effective if performed during or shortly after conditions that are likely to cause a water problem in a structure. Such conditions might include a rainfall, or a particular humidity condition or time of day (often during the night) at which a condensation problem is likely to occur in a structure. Before the start of the invented method, the structure is subjected to a uniform temperature for a sufficiently long period of time (typically an hour or more) so that the dry areas and moist areas (if any) of the structure are at approximately the same temperature at the start of the invented method.

In FIG. 1, the invented method starts in step S1. In step S2, the temperature of the structure is changed from its temperature pre-existing immediately before performance of the method. Preferably, the temperature changing step is performed with the structure's heating/air-conditioning system by adjusting the system's thermostat. Because in most structures such heating/air-conditioning systems are already in place, there is no need to move and set-up heating or cooling equipment in the performance of step S2, and accordingly, the method can be readily performed. Alternatively, a portable space heater, one of a wide variety of heaters used in the construction industry, or a portable air conditioning unit can be set-up within or without the structure, and used to perform the temperature changing step.

The degree to which the structure's temperature is changed relative to its pre-existing temperature should be sufficient to allow relatively cool areas of the structure to be distinguished from relatively warm areas of the structure in the performance of the method's infrared scanning step. However, if heating is used in the temperature changing step, the structure should not be heated to so great a degree that significant amounts of moisture are evaporated from the structure and a water problem thus not detected. In general, heating or cooling the structure by at least five degrees Fahrenheit above or below its pre-existing temperature should yield favorable results in most cases, although other values for the temperature change can be used. The temperature change can be monitored by observing the temperature at a wall surface of the structure, for example, with a thermometer, thermostat or other device. It should be borne in mind that the invented method takes advantage of temporary, non-equilibrium temperature differences caused by the relatively high thermal capacity of water in moist areas of the structure relative to that of the structure's dry areas. Therefore, upon changing the temperature of the structure, sufficient time should be allowed to elapse so that the temperature of the dry areas is sufficiently different from the temperature of the structure's moist areas to allow the moist and dry areas to be readily distinguished in the infrared scanning step. However, it is also essential to perform the method before the dry and moist areas both arrive at the changed temperature so that 5 there is a temperature difference between moist and dry areas that is detectable in the infrared scanning step. In typical cases, if the infrared scanning step is performed between fifteen and twenty minutes after changing the temperature between ten and fifteen degrees Fahrenheit above or below the pre-existing temperature of the structure, excellent contrast between dry and moist areas of the structure can be obtained in the infrared scanning step.

The infrared scanning step is used to detect moisture-suspect areas that have relatively slowly-changing temperatures compared to other areas of the structure when subjected to the changed temperature. The infrared scanning step can be performed with a variety of infrared scanning equipment, such as the Model Prism D.S. commercially available from F.L.I.R. Corporation of Portland, Oreg., the Model 550 commercially available from Agema Corporation of Newark, N.J., or the Model PM 380 commercially available from Inframetrics Corporation of Billerica, Mass. Training in the use of such equipment can also be obtained from the above-identified companies. Preferably, the infrared scanning equipment is capable of distinguishing temperature differences of one degree Fahrenheit or less in different areas of its field-of-view. The infrared scanner is typically mounted on a tripod and 20 can be used to scan a section of the inside or outside of the structure. By repositioning the infrared scanner to view adjacent sections of the structure, moisture-suspect areas that exhibit comparatively slow response to the changed temperature relative to other structure areas, can be detected over the entire structure. Preferably, moisture-suspect areas of the structure can be marked with chalk or tape, for example, for subsequent determination of whether moisture is present in such areas. Accordingly, the entire structure can be infrared scanned for any relatively slowly-changing temperature areas that may be due to the presence of moisture. Importantly, a relatively large section of the structure (on the order of tens or even hundreds of square feet) can be scanned at a time in the infrared scanning step. Therefore, the invented method can be used to scan the entire surface of a structure for moisture-suspect areas in a comparatively short period of time and with less repositioning of the scan equipment than would otherwise be required. In addition, because infrared scanning equipment such as the above-mentioned infrared scanning equipment has a relatively high resolution determined by its pixel density, the infrared scanning step reveals a comparatively complete picture of any moisture-suspect area as compared with other techniques.

In step S4, a determination is made to establish whether a detected moisture-suspect area does in fact contain moisture. The determination of step S4 can be performed with a variety of techniques and devices. For example, a capacitance meter such as the Wet-Wall Detector commercially-available from Tramex, Inc. of Dublin, Ireland, can be positioned over a relatively slowly-changing temperature area and used to scan such area for the presence of water. Because the capacitance characteristics of water are distinguishable from virtually all structural materials, the presence of moisture can be readily detected with the capacitance meter. Alternatively, an endoscopic probe such as those used in the medical industry, can be used to examine a moisture-suspect area. Typically, the endoscopic probe is snaked into an area of the structure that is invisible to the naked eye by insertion of the probe into an opening in the structure. Such an opening may be made by removing the plate of an electrical outlet or a light fixture, for example. The probe is snaked to the moisture-suspect area and used to view such area to determine whether the moisture-suspect area does in fact contain moisture. A third alternative is the use of two or more conductive pins that are driven into the structure in the relatively slowly-changing temperature area at spaced positions. A signal is applied to one pin and detected at the other pin(s). If the detected signal is not relatively attenuated, moisture is likely present. On the other hand, if the signal is relatively attenuated, water is not likely to be present in the area. A combination of the above techniques and devices can be used in the performance of step S4. For example, one particular device commercially-available from Protometer, Inc. of Marlow, England, can be used to perform both capacitance and resistance testing to determine whether a slowly-changing temperature area of the structure is due to the presence of moisture. In general, it is preferred to use non-destructive techniques such as capacitance testing or endoscopic probing over destructive techniques such as resistance pin testing that damages the structure to a degree and necessitates minor structure repairs.

If moisture is determined in step S4 to be present in an area of the structure, in step S5, a sample of the moisture can be collected and analyzed to determine the source of the moisture. In cases in which the water problem is not readily accessible, the sampling step is usually difficult to perform without causing minor structural damage to open the structure sufficiently to collect the moisture sample. However, where moisture can be readily collected from the structure, no such damage to the structure is necessary. One of several techniques can be used in the analyzing step, either alone or in combination, to determine the source of moisture. For example, the analyzing step can be performed by detecting the pH of the moisture with a pH meter or litmus paper, for example. If the moisture is relatively acidic, the source of moisture is determined to be rain. On the other hand, if the moisture is not relatively acidic, the source of moisture is not likely to be rain. Another alternative for the analyzing step is to detect whether salts are present in the moisture with a salinity meter, spectroscopy device or other equipment. If the moisture is relatively saline, the moisture is determined to be rising damp from the ground about the structure. On the other hand, if the moisture is not relatively saline, the moisture is determined not to be rising damp. As a third alternative, the analyzing step can be performed by checking the purity of the moisture with the combined pH and salinity meter, or with spectroscopy equipment, for example. If the moisture is relatively pure water, the moisture source is determined to be condensation. On the other hand, if the moisture is not relatively pure water, condensation is determined not to be the source of the water problem. By using the above techniques in the analyzing step, the source of the water problem can be readily determined so that appropriate action can be taken to dry-out the moist area and eliminate the water problem. After performance of step S5, or if the moisture-suspect area is determined not to be due to the presence of moisture in step S4, the performance of the method ends in step S6.

It should be noted that the invented method can be used not only to detect the extent of known water problems, but can also be used to periodically monitor a structure that is not known to have a water problem. Such monitoring with the invented method allows a hidden water problem to be detected in its earliest stages at which repairs to fix the moisture-affected area and eliminate the water problem may be relatively simple and inexpensive to perform. Also, the invented method can be used to monitor a dry-out procedure for a moisture-affected area.

The many features and advantages of the present invention are apparent from the detailed specification and thus it is intended by the appended claims to cover all such features and advantages of the described method which follow in the true spirit and scope of the invention. Further, since numerous modifications and changes will readily occur to those of ordinary skill in the art, it is not desired to limit the invention to the exact implementation and operation illustrated and described. Accordingly, all suitable modifications and equivalents may be resorted to as falling within the scope and spirit of the invention.

I claim:

1. A method for detecting moisture in a structure having a pre-existing temperature immediately before performance of the method, the method comprising the steps of:

a) changing the temperature of the structure to be different from the structure's pre-existing temperature; and b) infrared scanning the structure to detect a moisture-suspect area of the structure whose temperature is relatively slow to move to the changed temperature compared to other areas of the structure.

2. A method as claimed in claim 1, wherein said step (a) is performed by using a thermostat of the structure's heating/air-conditioning system to change the structure's temperature to be different from its pre-existing temperature.

3. A method as claimed in claim 2, wherein said step (a) is performed with the structure's heating system so as to heat the structure sufficiently above its pre-existing temperature that relatively warm dry areas of the structure can be readily distinguished from the moisture-suspect area that is relatively cool in the infrared scanning of said step (b).

4. A method as claimed in claim 3, wherein the heating is not performed so far above the pre-existing temperature that the moisture is significantly evaporated before the infrared scanning in said step (b) is performed.

5. A method as claimed in claim 2, wherein said step (a) is performed with the structure's air conditioning system so as to cool the structure below its pre-existing temperature so that relatively cool dry areas of the structure can be readily distinguished from relatively warm areas indicative of the presence of moisture in the infrared scanning of said step (b).

6. A method as claimed in claim 1, further comprising the step of:
   c) determining whether the moisture-suspect area of the structure is due to the presence of moisture.

7. A method as claimed in claim 6, wherein said step (c) includes the substeps of:
   c1) scanning the moisture-suspect area with a capacitance meter; and
   c2) determining whether the moisture-suspect area of the structure is due to the presence of moisture, based on said step (c1).

8. A method as claimed in claim 6, wherein said step (c) includes the substeps of
   c1) positioning an endoscopic probe into the structure in proximity to the moisture-suspect area of the structure;
   c2) viewing the moisture-suspect area with the endoscopic probe; and
   c3) determining whether the moisture-suspect area is due to the presence of moisture, based on said step (c2).

9. A method as claimed in claim 6, wherein said step (c) includes the substeps of:
   c1) inserting conductive pins into the structure in proximity to the moisture-suspect area of the structure;
   c2) applying a signal to one pins;
   c3) detecting the signal level at another pin; and
   c4) determining whether the moisture-suspect area is due to the presence of moisture, based on the detected signal level.

10. A method as claimed in claim 1, further comprising the steps of:
    c) sampling moisture from the moisture-suspect area of the structure;
    d) analyzing the moisture; and
    e) determining the source of the moisture, based on said step (d).

11. A method as claimed in claim 10, wherein the analyzing of said step (d) is performed by detecting the pH of the moisture, and wherein the source of moisture is determined to be rain in said step (e) if the pH detecting indicates that the moisture is relatively acidic, and wherein the source of moisture is determined not to be rain in said step (e) if the pH detecting indicates that the moisture is not relatively acidic.

12. A method as claimed in claim 10, wherein the analyzing of said step (d) is performed by detecting whether salts are present in the moisture, and wherein the source of moisture is determined to be rising damp in said step (e) if the moisture is relatively saline, and wherein the source of moisture is determined in said step (e) not to be rising damp if the moisture is not relatively saline.

13. A method as claimed in claim 10, wherein the analyzing of said step (d) is performed by detecting whether the moisture is relatively pure, and wherein the source of moisture is determined in said step (e) to be condensation if the moisture is relatively pure, and wherein the source of moisture is determined in step (e) not to be condensation if the moisture is not relatively pure.

14. A method as claimed in claim 1, wherein the structure is a building.

15. A method as claimed in claim 1, wherein the structure is a house.

* * * * *